(12) United States Patent
Cohen

(10) Patent No.: US 11,207,753 B2
(45) Date of Patent: Dec. 28, 2021

(54) APPARATUS FOR STORING SCREWS AND GUIDING SCREWS DURING INSERTION

(71) Applicant: VEZACHARTA GYPSUM SPIDER LTD., Bnei Brak (IL)

(72) Inventor: Aharon Cohen, Bnei Brak (IL)

(73) Assignee: VEZACHARTA GYPSUM SPIDER LTD., Bnei Brak (IL)

( * ) Notice: Subject to any disclaimer, the term of this patent is extended or adjusted under 35 U.S.C. 154(b) by 113 days.

(21) Appl. No.: 16/558,126

(22) Filed: Sep. 1, 2019

(65) Prior Publication Data

US 2019/0381616 A1    Dec. 19, 2019

Related U.S. Application Data

(63) Continuation-in-part of application No. PCT/IL2018/050215, filed on Feb. 26, 2018.

(30) Foreign Application Priority Data

Mar. 2, 2017   (IL) .......................................... 250910

(51) Int. Cl.
   *B23Q 3/154*   (2006.01)
(52) U.S. Cl.
   CPC ................... *B23Q 3/1546* (2013.01)
(58) Field of Classification Search
   CPC . B25H 3/06; B25H 3/00; B25H 3/003; B65D 25/108; B25B 23/06; B25B 23/005; B25B 23/04; B25B 23/045; F16B 27/00
   See application file for complete search history.

(56) References Cited

U.S. PATENT DOCUMENTS

| | | | | |
|---|---|---|---|---|
| 2,953,970 A | * | 9/1960 | Maynard | G03B 17/12 359/611 |
| 4,047,611 A | * | 9/1977 | Damratowski | B25B 23/045 206/347 |
| 5,671,641 A | * | 9/1997 | Stephenson, Jr. | B25C 3/008 81/44 |
| 6,974,030 B1 | * | 12/2005 | Sundstrom | B25B 23/005 206/347 |

(Continued)

FOREIGN PATENT DOCUMENTS

GB        2147873 A      5/1985

OTHER PUBLICATIONS

International Search Report dated Jun. 18, 2018, for PCT/IL2018/050215.
Written Opinion dated Jun. 18, 2018, for PCT/IL2018/050215.

*Primary Examiner* — Tyrone V Hall, Jr.
(74) *Attorney, Agent, or Firm* — Paul D. Bianco; Gary S. Winer; Fleit Intellectual Property Law

(57) ABSTRACT

An apparatus for storing fasteners, typically screws, and guiding them during insertion into a surface employs a block of material having a lower face for bringing into proximity with surface and an upper face, parallel to the lower face. A set of screws are embedded in the block with their central axes parallel such that the screw heads are accessible to a driver from an upper face and screw tips are located within the block adjacent to a lower face. The screws are preferably deployed in side-by-side rows, advantageously in one or more rectangular or hexagonal grid. A driver acting on the head of one of screws is effective to drive the screw through block and into surface to reach a final inserted position.

25 Claims, 12 Drawing Sheets

(56) References Cited

U.S. PATENT DOCUMENTS

| | | | |
|---|---|---|---|
| 7,350,643 B2 * | 4/2008 | Capanni | A61B 90/50 |
| | | | 206/339 |
| 8,174,274 B2 * | 5/2012 | Lawrence | G01N 27/24 |
| | | | 324/686 |
| 2007/0258793 A1 * | 11/2007 | Sundstrom | F16B 27/00 |
| | | | 411/442 |
| 2008/0000942 A1 | 1/2008 | Sundstrom | |
| 2011/0056858 A1 | 3/2011 | Benczkowski et al. | |
| 2011/0108446 A1 | 5/2011 | Bettenhausen et al. | |
| 2015/0343582 A1 * | 12/2015 | Ebihara | B23B 31/02 |
| | | | 279/128 |

* cited by examiner

APPARATUS FOR STORING SCREWS AND GUIDING SCREWS DURING INSERTION

FIELD OF THE INVENTION

The present invention relates to handling of screws, fasteners, nails and the like, in particular, it concerns a container in which to store, and from which to deploy, screws.

BACKGROUND OF THE INVENTION

It is common practice to sell and store screws in a box or container until they are needed for use. In many applications where many screws are needed, significant time and effort is spent on fishing screws out of the container, aligning and positioning the screws in the correct orientation and position, and retrieving screws accidentally dropped during this process.

It has been proposed to provide a row of screws loaded into a clip for sequential use. Such strips are particularly useful for automated systems. For manual deployment, such strips either hold only a very limited number of screws or quickly become unwieldly due to their length.

SUMMARY OF THE INVENTION

It is hence one object of the invention to disclose an apparatus for storing fasteners and guiding the fasteners during insertion into a surface. The aforesaid apparatus comprises (a) at least one fastener configured for inserting into the surface; each of the fastener having a head and tip interconnected by a middle elongate portion; (b) a fastener support configured to support the at least one fastener with the central axes parallel to each other, the fastener support being further configured to render a head of at least one fastener accessible with a tool configured for inserting the at least one fastener into the surface and, when the fastener support is placed in proximity to the surface, to allow each of the fasteners to advance through the fastener support to penetrate into the surface, and (c) a magnet configuration comprising a magnet, the magnet configuration disposed adjacent to the tips of the at least one fastener so as to provide tactile feedback when the fastener support is in alignment with a soft magnetic material.

Another object of the invention is to disclose magnet which is an effective magnet to support the apparatus in contact with the surface for hands-free use.

A further object of the invention is to disclose the fastener support comprising a block of material in which the at least one fastener is embedded.

A further object of the invention is to disclose the fastener selected from the group consisting of a screw, a nail, a bolt, a dowel and any combination thereof.

A further object of the invention is to disclose the material of the block which is resilient polymer foam shaped conformally to the at least one fastener.

A further object of the invention is to disclose the material of the block formed primarily from fiber pulp.

A further object of the invention is to disclose the head of the at least one fastener positioned within the material below a level of an upper face of the block. The block of material is formed with a guide channel extending from the upper face to each fastener head to guide a tool bit to the fastener head.

A further object of the invention is to disclose the apparatus further comprising a plurality of washers, each of the washers being countersunk into a lower face of the block in concentric alignment with a corresponding one of the at least one fastener.

A further object of the invention is to disclose the block reinforced with a frame or inner matrix formed from a second material that is relatively more rigid than the material of the block, the frame or inner matrix forming a spacer to limit an extent of penetration of a driver bit through the block.

A further object of the invention is to disclose the plurality of fasteners of at least two different sizes.

A further object of the invention is to disclose the apparatus further comprising a holder having a receiving portion for removably receiving the fastener support and a handle providing a handgrip.

A further object of the invention is to disclose the receiving portion comprising a base surface and a top surface, the base surface and the top surface being formed with apertures positioned so as to come into alignment with the at least one fastener when the fastener support is received in the holder.

A further object of the invention is to disclose the handle which is adjustable in length and/or angular position relative to the receiving portion.

A further object of the invention is to disclose the holder further comprising a magnet deployed to facilitate tactile sensing of proximity of the holder to a soft-magnetic material.

A further object of the invention is to disclose the fastener support further comprising a recess configured for receiving a magnet to facilitate tactile sensing of proximity of the holder to a soft-magnetic material.

A further object of the invention is to disclose the fastener support which bears markings to indicate the distances between fasteners.

A further object of the invention is to disclose the apparatus comprising an indicator configured for locating metallic objects under the surface.

A further object of the invention is to disclose the fastener characterized by a shape selected from the group consisting of a linear shape, a crosswise shape, a round shape, a rectangular shape and any combination thereof.

A further object of the invention is to disclose the at least one magnet disposed in a portion of the fastener support selected from the group consisting of a middle portion, a peripheral portion and a combination thereof.

A further object of the invention is to disclose the fastener support rotatable relatively to the holder.

A further object of the invention is to disclose the fastener support releasably lockable in the holder.

A further object of the invention is to disclose the magnet encapsulated within a housing made of a Mu metal such that interaction between said magnet and said fasteners is minimized.

An apparatus for storing fasteners and guiding the fasteners during insertion into a surface, the apparatus comprising:
  a. at least one fastener configured for inserting into said surface; each of said fastener having a head and tip interconnected by a middle elongate portion;
  b. a fastener support configured to support said at least one fastener with said central axes parallel to each other, said fastener support being further configured to render a head of at least one fastener accessible with a tool configured for inserting said at least one fastener into said surface and, when said fastener support is placed in proximity to the surface, to allow each of said fasteners to advance through said fastener support to penetrate into the surface; and a scanner disposed adjacent to said tips of said at least one fastener so as to provide feedback when the fastener support is in alignment with the metal or wooden support structure.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of an apparatus for storing screws and guiding screws during insertion according to the present invention may be better understood with reference to the drawings and the accompanying description.

Figure 1:
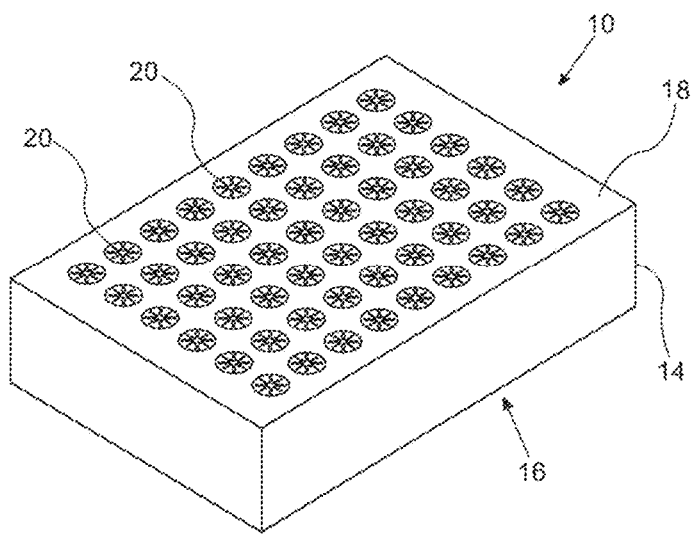
FIG. 1 is an isometric view of a magazine block, showing a two-dimensional array of screws embedded within the block.
Figure 2:
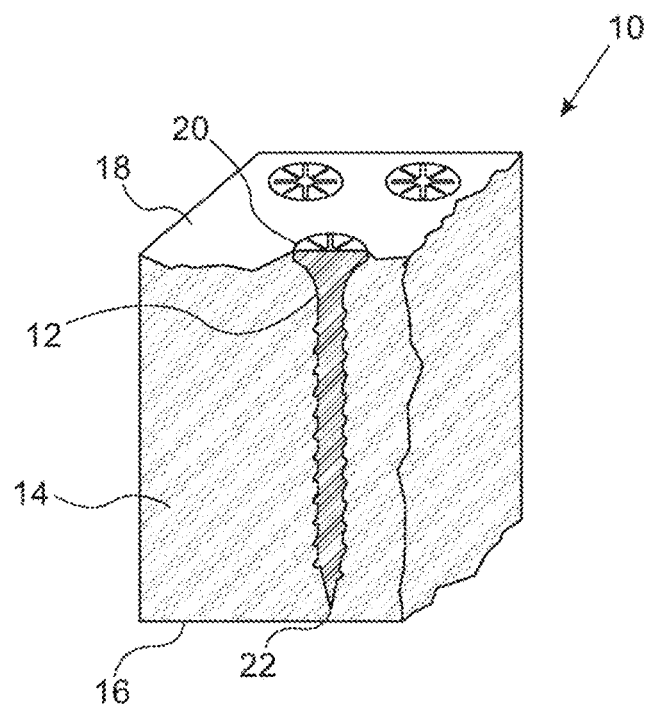
FIG. 2 is a partial, cut-away view of the block of FIG. 1 showing the deployment of a screw embedded within the block.
Figure 3:
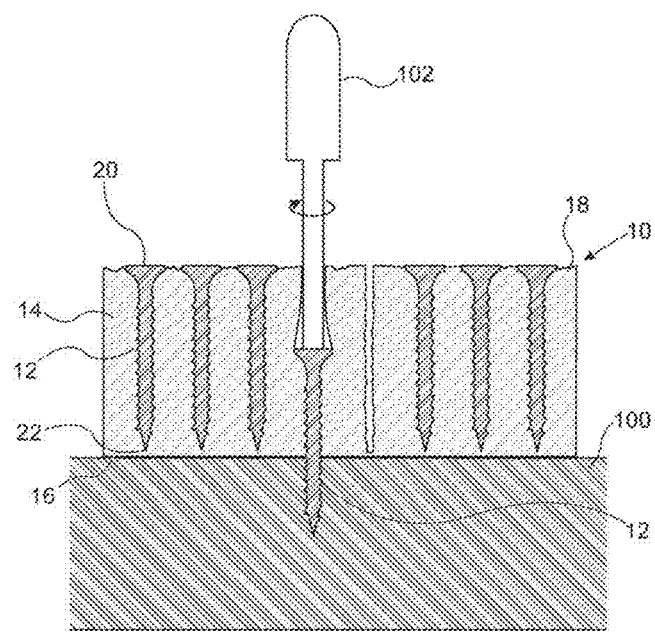
FIG. 3 is a schematic cross-sectional view taken through the block of FIG. 1 during insertion of a screw into a surface.

Referring now to the drawings, FIGS. 1-3 show various views of an apparatus 10, constructed and operative according to an embodiment of the present invention, for storing fasteners, typically screws 12, and guiding them during insertion into a surface 100 (FIG. 3). According to certain embodiments of the present invention, apparatus 10 employs a screw support, shown here implemented as a block 14 of material having a lower face 16 for bringing into proximity with surface 100 and an upper face 18, parallel to the lower face. A plurality of screws 12, each having a threaded shaft extending along a central axis from a head 20 to a tip 22, are held within the screw support, for example, embedded in block 14, with their central axes parallel such that heads 20 are accessible to a driver 102 (FIG. 3) from upper face 18 and tips 22 are located within block 14 adjacent to lower face 16. The screws are preferably deployed in a plurality of side-by-side rows, advantageously in one or more rectangular or hexagonal grid, typically allowing inclusion of at least 30, more typically at least 50, and in some particularly preferred cases over 80 screws in a single block.

The screw support is configured, by suitable selection of materials and/or its structure, such that, when lower face 16 is brought into proximity with surface 100, a driver 102 acting on head 20 of one of screws 12 is effective to drive the screw through block 14 and into surface 100 to reach a final inserted position.

At this stage, various advantages of the present invention will be readily evident. Block 14 is preferably preloaded with screws 12 as part of the manufacturing process, serving as a storage magazine. By providing the screws in such blocks, the user is saved from the need to handle individual screws, and avoids the inconveniences of being pricked by screw points when trying to pick out a screw from a bag or box of loose screws, of being unable to hold a sufficient number of screws for a sequence of operations, and of dropping individual screws. The invention thus helps to eliminate the "fishing and fumbling time" of the user, providing correctly oriented screws in a convenient holder ready to use. When placed against a surface, the block provides correct alignment of the screw ready for insertion, and keeps the user's fingers clear of the screw head, reducing risk of injury. These and other advantages of the present invention will become clearer from the following description.

The apparatus of the present invention may be used to advantage with various different types of driver, including conventional manual screwdrivers, ratchet screwdrivers, and electric screwdrivers.

The screw support may be implemented in a wide range of ways, ranging from a continuous block of material in which the screws are embedded to a dedicated molded plastic cartridge or clip. On its most fundamental level, the present invention encompasses all such arrangements, independent of the materials and structural details of the screw support. Depending on the structure and the choice of materials, the screw support may be either a single use unit, rendered unusable by irreversible deformations occurring on passage of the screws, or may be a multi-use unit which can be refilled for reuse.

The screw support may be configured to comprise a single screw.

In a first subset of implementations of the present invention, block 14 is a monolithic block of a single material. For such applications, block 14 may advantageously be formed from resilient polymer foam. Suitable examples include, but are not limited to, polyurethane foam, polyethylene foam and polypropylene foam. Relatively low density foams are typically preferred. These foams have sufficient resilience and tensile strength that they typically deform momentarily to allow passage of the screw head and draw the adjacent regions of foam around the screw head, then returning towards their original positions after passage of the screw head. This tends to ensure that no material remains trapped under the screw head when it is fully inserted into a surface.

A further subset of exemplary implementations employs a block 14 of material formed primarily from fiber pulp, such as various structures of corrugated cardboard, recycled paperboard or the like. The fiber pulp may be of natural fibers, artificial fibers or any combination thereof, and is most preferably primarily formed from recycled materials. In this case, the clearance of the screw head though the material may involve some degree of tearing of layers of the material.

In some cases, the screw support may be formed from combination of different layers of one or more material, which may also be structured layers. Thus for example, a number of corrugated layers with undulations in one or two dimensions, or other sorts of contoured layers, may be joined together to form an airy screw support structure. Other types of structures, or microstructures, and materials for forming a screw support also fall within the scope of the present invention. In some cases, porous or sponge structures may be used.

Depending upon the material properties, it may be preferable in certain cases to provide a preformed bore or channel within which at least part of each screw sits. When a bore is provided, at least part of the bore is of diameter smaller than the external diameter of the threaded shaft of the screw to ensure that the screw is reliably held in place. Use of a preformed channel may be particularly useful when using a block formed from less resilient material, such as certain fiber-based material or polystyrene foam, since it reduces the amount of destructive deformation which is required for passage of the screw head. Where a bore is provided, the bore may optionally have a quantity of lubricant material introduced into it, which reduces friction on a driver bit passing through the block during use of a screw and withdrawal of the bit from the block. Even where no preformed bore is provided, lubricant material may optionally be introduced by applying it to the screws before they are inserted into the block. Alternatively, the bulk material of the block may be implemented with additives to reduce friction.

Figure 7:
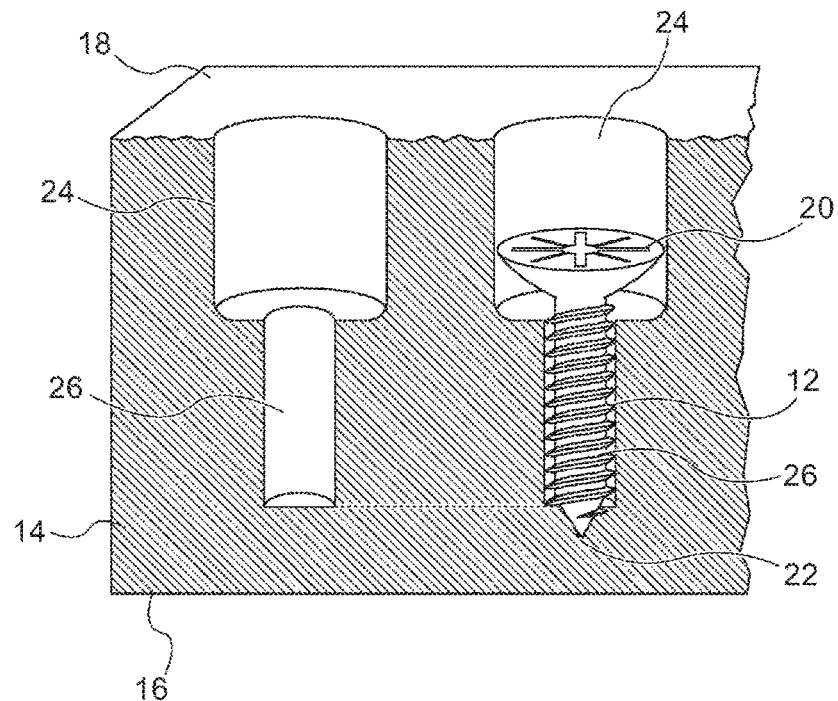
FIG. 7 is a cut-away isometric view similar to FIG. 2 illustrating a variant implementation in which a screw is provided with a positioning tunnel.

In certain cases, it may be desirable for the heads 20 of at least some of screws 12 to be positioned within the material below a level of upper face 18, and for block 14 to be formed with a guide channel 24 extending from the upper face 18 to each screw head 20 to guide a driver bit to the screw head, as shown in FIG. 7. Guide channels 24 may be either cylindrical or conical, the latter option further helping to align a driver bit with the screw head 24. This helps to align a driver bit quickly with the screw head during use. These guide channels 24 may be used in combination with a screw-shaft bore 26, as described above, or without such a bore. When it is desired to provide different lengths of screws in a single block 14, the shorter screws are typically provided with a guide channel 24 while the longer screws are deployed with either a shorter guide channel or with no guide channel, thereby facilitating visual identification of the respectively longer and shorter screws.

According to a further subset of implementations of the invention, block 14 may combine two or more types of materials. In this case, one of the materials may advantageously be a relatively more rigid material, which serves to provide structural integrity to the block, and which may advantageously serve as a spacer, defining a maximally inserted position of an electric screwdriver or the like. By setting the length of the bit to match the thickness of the block, it is then possible to employ the block as a mechanical stop to ensure that each screw is fully inserted into the surface, but is stopped before over-inserting the screw.

Figure 8:
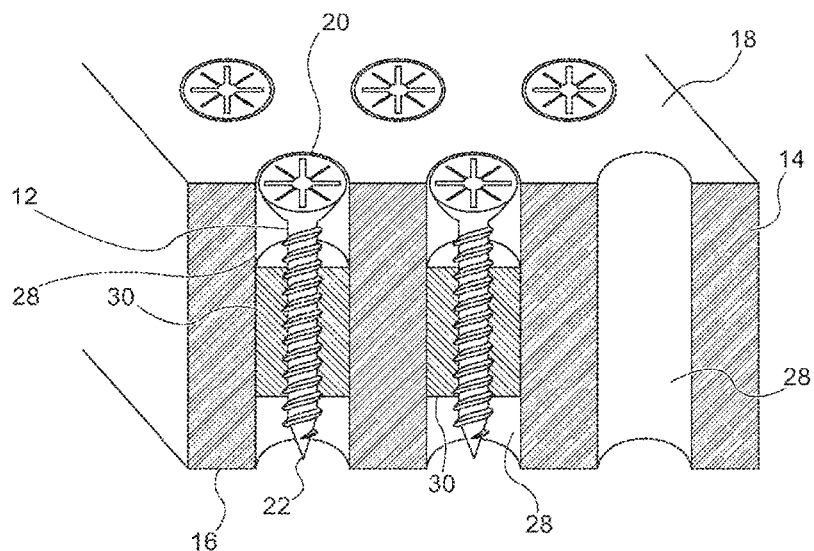
FIG. 8 is a cut-away isometric view similar to FIG. 2 illustrating a further variant implementation in which screws are retained within an array of through-bores.
Figure 9:
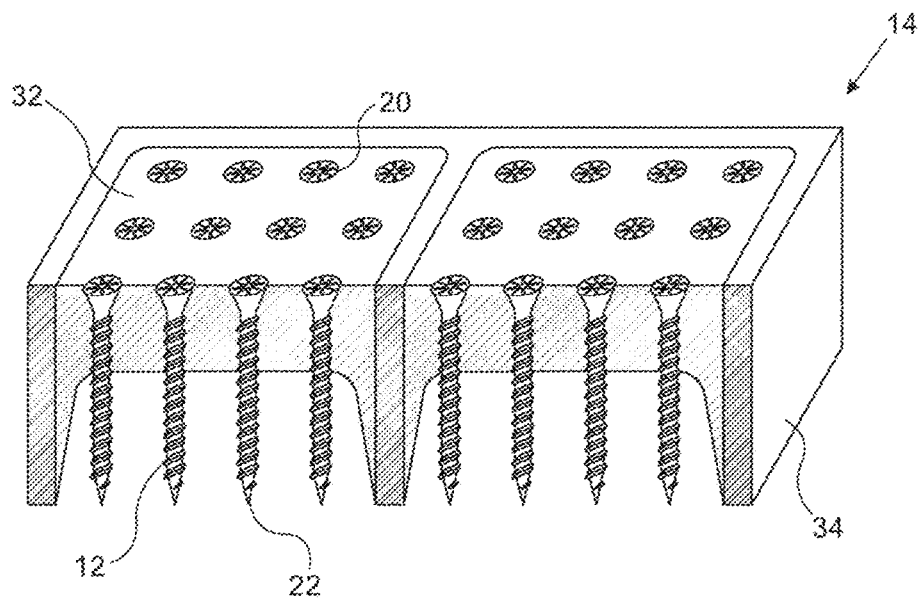
FIG. 9 is a cut-away isometric view illustrating a further variant implementation of a block according to an embodiment of the present invention.

FIGS. 8 and 9 illustrate two non-limiting examples of implementations using two different materials. According to the implementation of FIG. 8, a relatively more rigid block 14 is formed with a plurality of channels 28 which are larger than the dimensions of each screw. A quantity of a secondary material 30 is provided within channels 28 to retain screws 12 in position until use. In this case, the rigid block may be made from a wide range of relatively rigid materials, including but not limited to, various plastics and polystyrene foam of suitable density. Secondary material 30 may be any of the materials described above as suitable for a monolithic implementation of block 14, but may also be a range of other materials such as, for example, nonstructural materials such as various viscous gels, glues, grease, wax or the like, which are sufficient to retain screws 12 reliably within channels 28 prior to use. Secondary material 30 may be applied along the entirety of channel 28, or only in one or more region of the channel, such as, for example, the lower end of the channel, or the upper end of the channel, or at some intermediate location as illustrated here.

FIG. 9 illustrates a further example of a compound material block 14 in which materials 32 suitable for implementing a monolithic block, such as resilient polymer materials, are integrated within a framework 34, which may be an outer frame, an inner matrix or any other integrated support structure, formed from relatively more rigid and/or stronger materials. Material 32 may be inserted into or around framework 34 during manufacture, or the two materials may be combined using a suitable manufacturing process, such as dual-material injection molding.

In the structure of FIG. 9, material 32 may be a full-thickness layer sufficient to contain the screws 12, fully analogous to the block of FIG. 1. Alternatively, as illustrated here, material 32 may be formed with a reduced thickness, deployed to grip the upper part, the lower part or an intermediate part of the screws. Framework 34 is preferably dimensioned to encompass the entire height of the screws, thereby still providing protection to the screw tips 22 and heads 20. As mentioned, screws 12 are advantageously arranged in a number of side-by-side rows, optionally in a rectangular or hexagonal grid. Where a framework 34 is provided, this typically dictates subdivision of the screws into a number of distinct spaced-apart regions, each of which may form a grid.

As mentioned earlier, the various implementations of the present invention may include screws of two or more different sizes. "Sizes" in this context refers not only to length, but also to core diameter, thread diameter, head type, and any other variable parameters by which screws may be differentiated. The use of a single block to house a plurality of different types of screws is of particular use where a selection of different screws or other fasteners required for assembly of a specific assembly are provided together with the components of the assembly, for example, for assembly of a piece of furniture.

Figure 10:
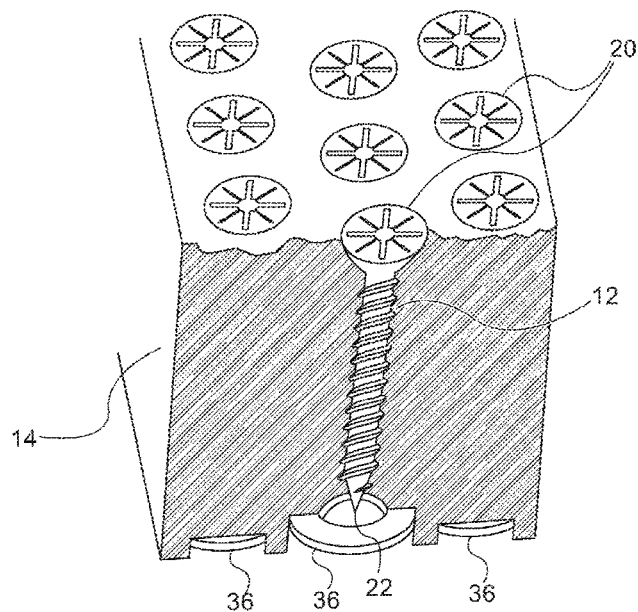
FIG. 10 is a cut-away isometric view similar to FIG. 2 illustrating deployment of preplaced washers co-aligned with each screw.

In certain cases, screws 12 may be combined with other devices. By way of example, FIG. 10 illustrates a case where annular washers 36 are provided for some or all of the screws. In this case, washers 36 are preferably countersunk (embedded) in lower face 16 of block 14, in concentric alignment with a corresponding one of screws 12. As the screw is driven into the underlying surface, the head of the screw bears on the washer, freeing it from block 14 and pressing it against the underlying surface so as to remain deployed around the head of the screw in its final state.

Figure 4:
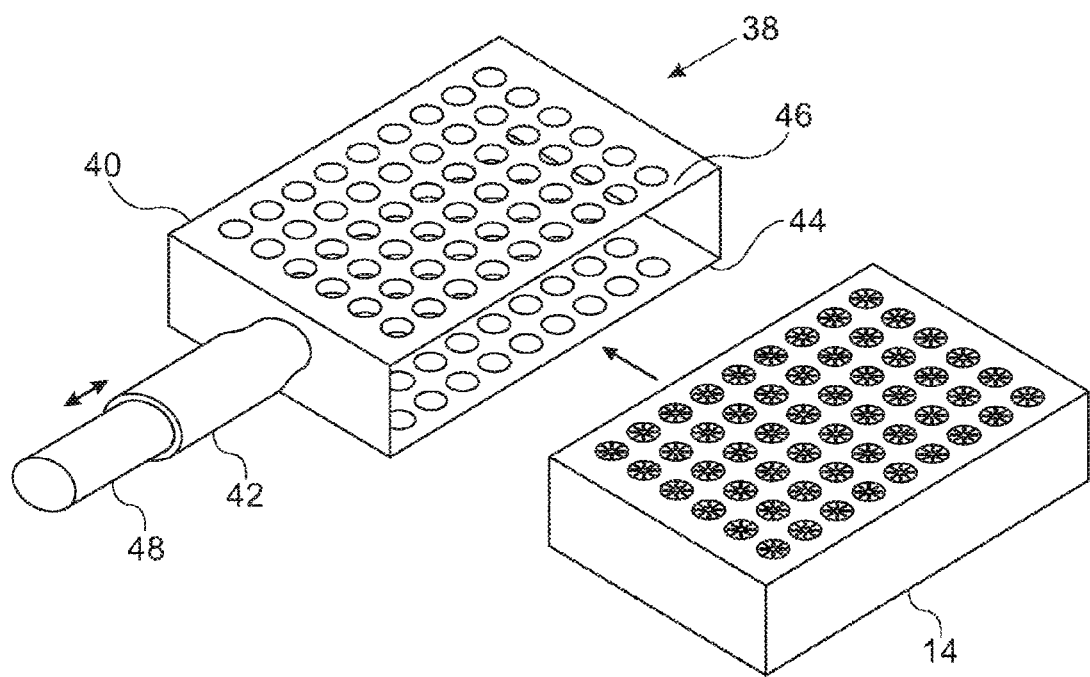
FIG. 4 is a schematic isometric view of a first implementation of a holder for receiving the block of FIG. 1.

In many cases, the various blocks 14 according to the present invention may conveniently be held directly in a user's hand during introduction of screws into a surface. In some cases, however, it may be advantageous to provide a handle extending from the block for the user to hold. In certain implementations, a handle may be implemented as an integral part (not shown) of block 14 extending away from the main portion of the block. In other cases, it has been found advantageous to provide a holder 38 having a receiving portion 40 for removably receiving block 14 and a handle 42 providing a handgrip for the user. Two such examples are illustrated here in FIGS. 4 and 5. Referring first to FIG. 4, in this case, receiving portion 40 is implemented as an open-sided receptacle into which block 14 is inserted. Receiving portion 40 may be implemented as a frame extending around the perimeter of block 14 without covering the upper and lower surfaces. Alternatively, as in the example illustrated here, receiving portion 40 includes a base surface 44 for juxtaposition with the lower face 16 of the block when the block is received in the holder and/or a top surface 46 for juxtaposition with the upper face 18 of the block when the block is received in the holder. Base surface 44 and top surface 46 are formed with respective apertures positioned so as to come into alignment with screws 12 when the block is received in the holder. Block 14 and receiving portion 40 preferably includes complementary alignment features and/or locking features (not shown) to ensure correct alignment of the block within the receiving portion.

Optionally, handle 42 may be adjustable in length and/or angular position relative to receiving portion 40. In the schematic example illustrated here, handle 42 is shown as having a telescopic length adjustment 48.

Figure 5:
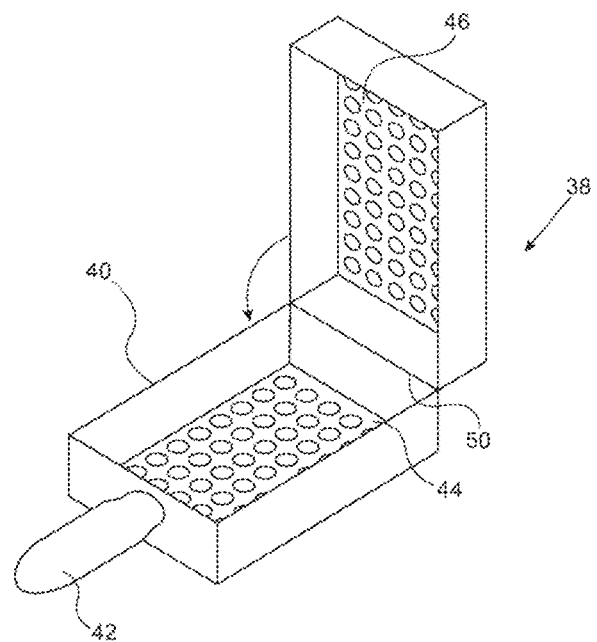
FIG. 5 is a schematic isometric view of a second implementation of a holder for receiving the block of FIG. 1 a cut-away isometric view of a screw in a preformed tunnel.

FIG. 5 shows an alternative implementation of a holder 38 with equivalent elements labeled similarly. In this case, base surface 44 and top surface 46 are implemented as parts of respective hinged elements interconnected at a hinge 50 so as to allow closing of the receiving portion 40 around block 14.

Figure 6:
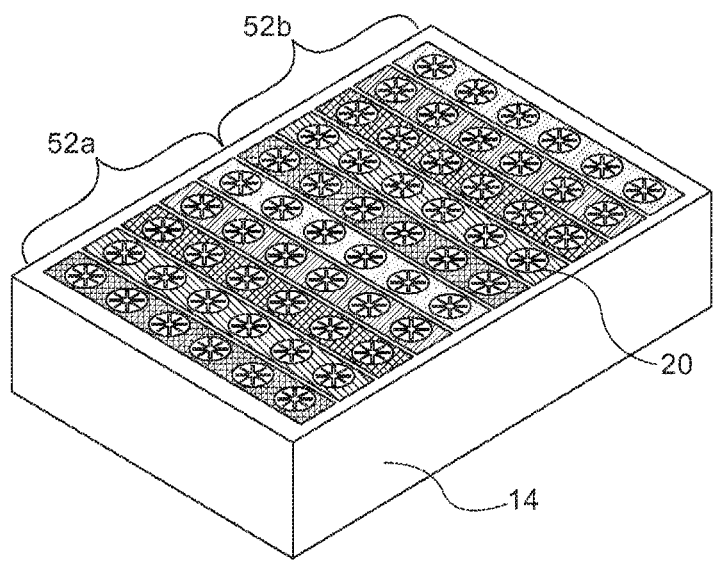
FIG. 6 is a schematic isometric view of the block of FIG. 1 provided with additional colored graduations at predefined spacings.

Turning now to FIG. 6, in certain applications, it is common that screws need to be inserted at regular predefined spacing. For example, during attachment of gypsum board to aluminum profiles, certain conventions call for screws to be inserted at 10 cm intervals. To facilitate correctly-spaced deployment, certain particularly preferred implementations of the present invention provide visual markings to conveniently indicate the required spacing. By way of one non-limiting example, FIG. 6 shows a block 14 in which successive rows of screws are coded with different colors or patterns in a color sequence which repeats itself at a predefined spatial interval, for example, each 10 cm. The user can then readily ensure that the next screw is inserted at the desired interval from the previous screw by aligning a particular row color or pattern with the previously inserted screw and then inserting the next screw from the spaced-apart row of the same color or pattern. Thus, for example, in a 20 cm long block with screws every centimeter, the rows may be coded with a sequence of 10 colors or patterns 52a in the first 10 cm which repeat cyclically 52b over the second 10 cm. It is thus immediately apparent how to position the block so that any chosen screw will be at a spacing of 10 cm from the previous screw. Additionally, or alternatively, a scale of measurements may be provided along one or more edge of the block. Although shown here as a property of block 14, such markings may alternatively, or additionally, be provided on top surface 46 of a holder 38, such as the holders of FIG. 4 or 5.

Figure 11:
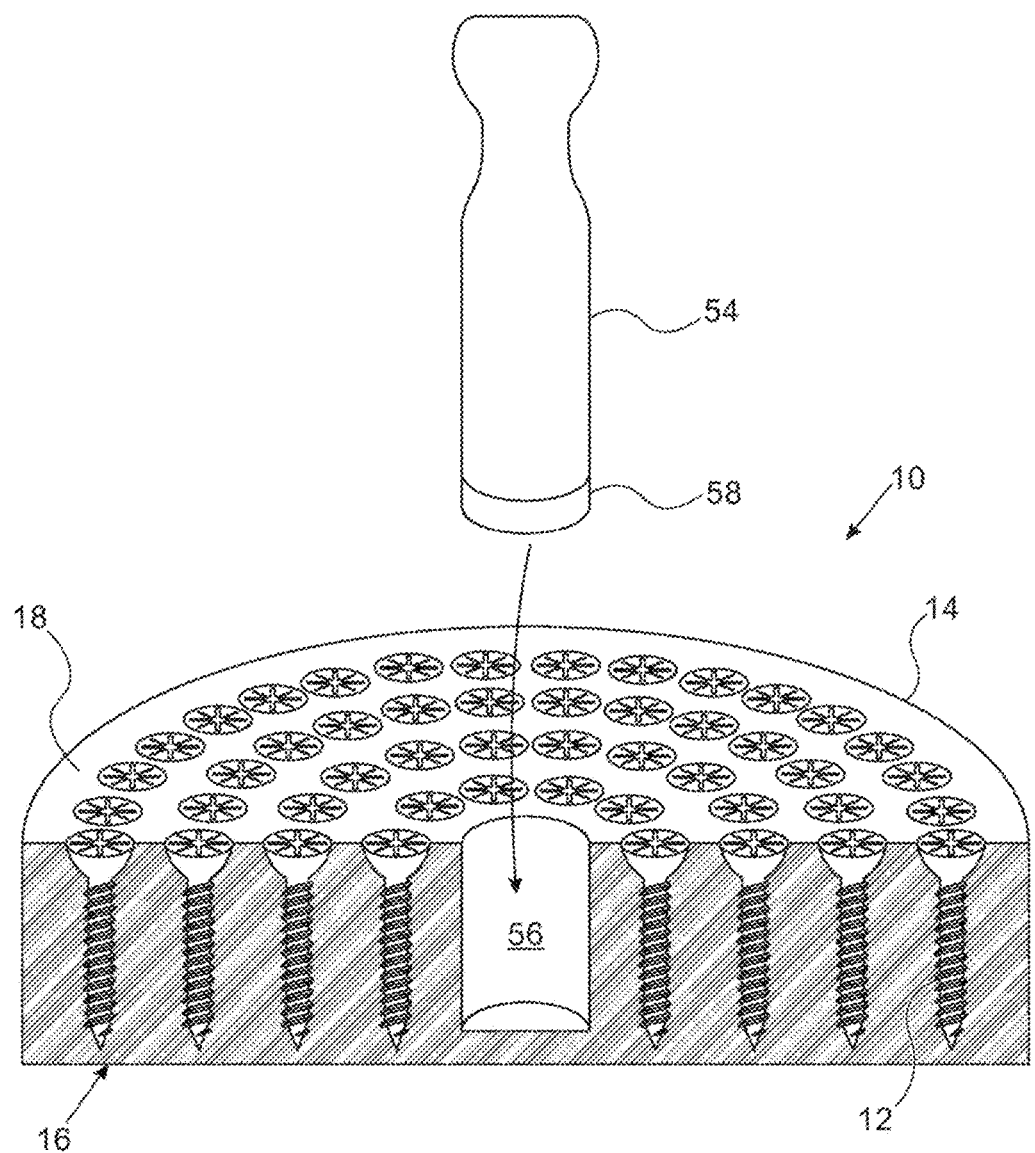
FIG. 11 is a cut-away isometric view of a further variant implementation of a block according to an embodiment of the present invention, for use with a removable handle carrying a magnet.

Turning now to FIG. 11, it should be noted that the present invention is not limited to rectangular blocks, and may in fact have particular advantages if implemented in certain other forms. By way of one non-limiting example, FIG. 11 illustrates a block 14 which is formed as a round disk with circular rows of screws 12. A block of this form may conveniently be manipulated via a handle 54 which is received in a central recess 56. Block 14 can then be turned as required to bring successive portions of block 14 into a convenient position for use. Optionally, a suitable holder (not shown) may be provided for receiving the round block, optionally also with a rotation mechanism for rotating the block about its axis to make different screws available successively at an open region of the holder, all as will be clear to a person having ordinary skill in the art. In this case, only part of the area of the receiving portion has holes, or a larger open area, to allow use of the screws, while a majority of the block may be closed within the receiving portion.

According to a further optional feature which may be used with any of the implementations of the present invention described herein, a magnet may be deployed to facilitate tactile sensing of proximity of the device to a soft-magnetic material, such as a steel support element. The magnet may be integrated into a holder, such as one of the holders 38 illustrated above with reference to FIGS. 4 and 5, or may be deployed as part of block 14. In the latter case, the magnet may be a removable magnet configured for use interchangeably with a number of blocks 14, or may be an integrated magnet embedded in each block. In some cases, the magnet may be sufficiently strong to hold apparatus 10 in position against a surface while in use, even without the user maintaining a grip on the apparatus.

By way of one non-limiting example, FIG. 11 illustrates a magnet 58 integrated with the base of handle 54 such that, when handle 54 is inserted into recess 56, magnet 58 is deployed in proximity to lower face 16, thereby providing tactile feedback to facilitate sensing of proximity of the magnet to a soft-magnetic material. To maintain correct alignment of handle 54, and magnet 58, with block 14, recess 56 preferably does not extend through to lower face 16. However, the proximity to lower face 16 (typically up to about 1 cm) is sufficient to provide the desired tactile feedback when the block is brought close to a soft-magnetic material.

Although described hereinabove primarily with reference to screws, it should be noted that apparatus 10 may be implemented to advantage with a wide range of types of fasteners which can be pre-embedded in block 14 and deployed through the block. Other examples include, but are not limited to, nails, pins, tacks and staples. In certain cases, it may be useful to employ a structure analogous to that of FIG. 9 which supports only the lower part of each fastener together with a somewhat enlarged spacing, allowing the use of a hammer to introduce the fasteners, at least until they are well embedded in the underlying surface, after which the block can be removed and the remaining hammering done without the block present. More preferably, a small-diameter nail-driver is used to engage the head of each fastener, thereby allowing full insertion of a nail or other fastener in the same manner discussed above in relation to screws.

Figure 12:
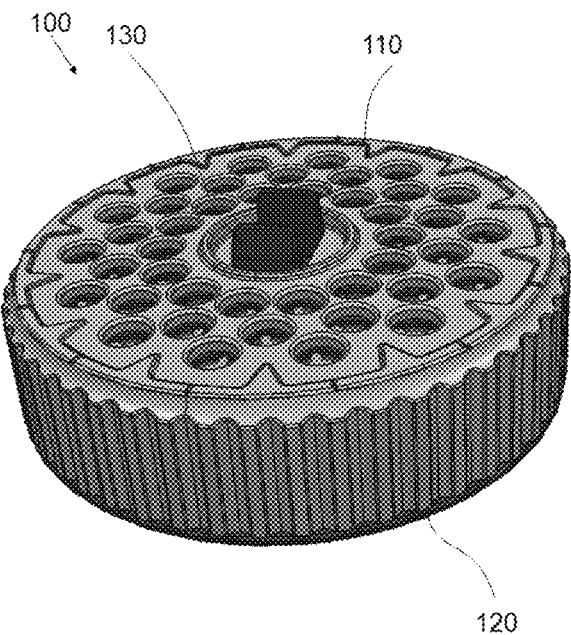
FIG. 12 is an isometric view of a proximal side of an apparatus for storing and guiding apparatus for storing fasteners and guiding fasteners.
Figure 13:
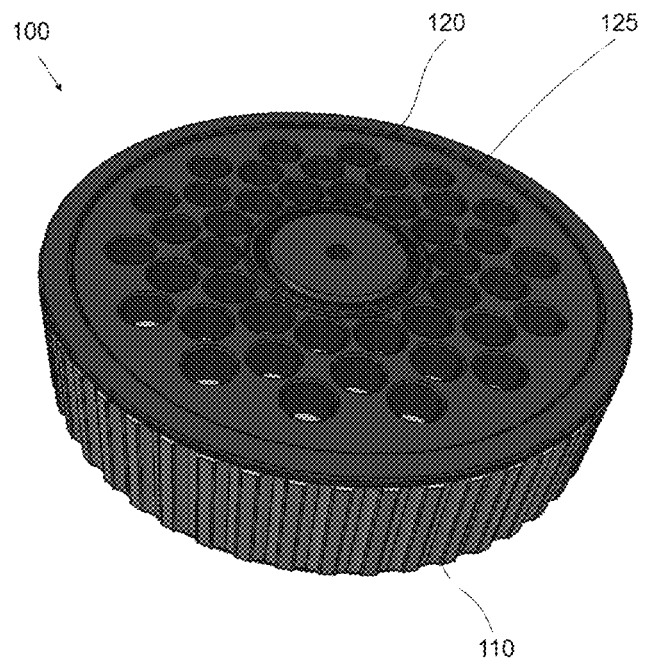
FIG. 13 an isometric view of a distal side of an apparatus for storing and guiding apparatus for storing fasteners and guiding fasteners.

Reference is now made to FIGS. 12 and 13 presenting isometric views of proximal and distal sides of apparatus 100 for storing and guiding fasteners, respectively. Fasteners (not shown) are stored between base member 120 and clip-on cap 110. Numeral 125 refers to a magnet secured to base member. Magnet 125 is encapsulated within a housing made of a Mu metal such that interaction between magnet 125 and stored fasteners is minimized. Cap 110 is releasable securable to said base member by click 130.

Figure 14:
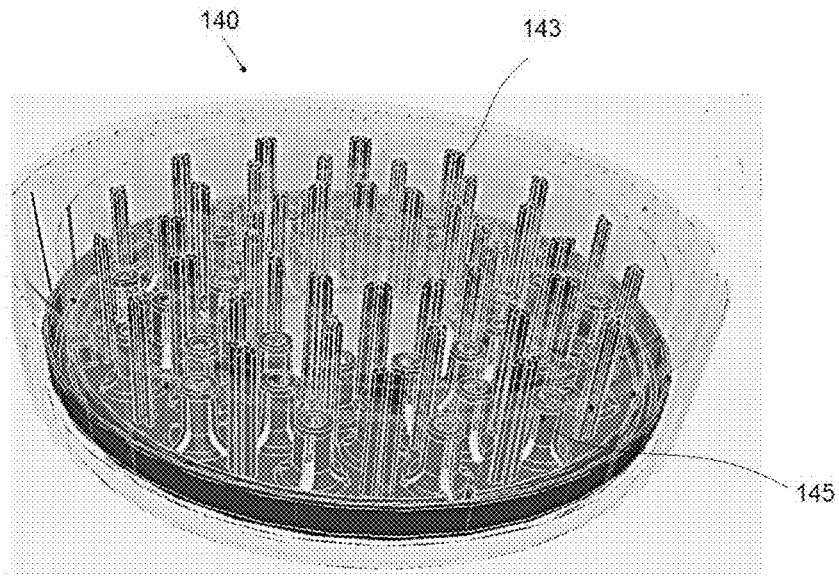
FIGS. 14 to 16 illustrate stage-by-stage assembling of an apparatus for storing and guiding apparatus for storing fasteners and guiding fasteners.
Figure 15:
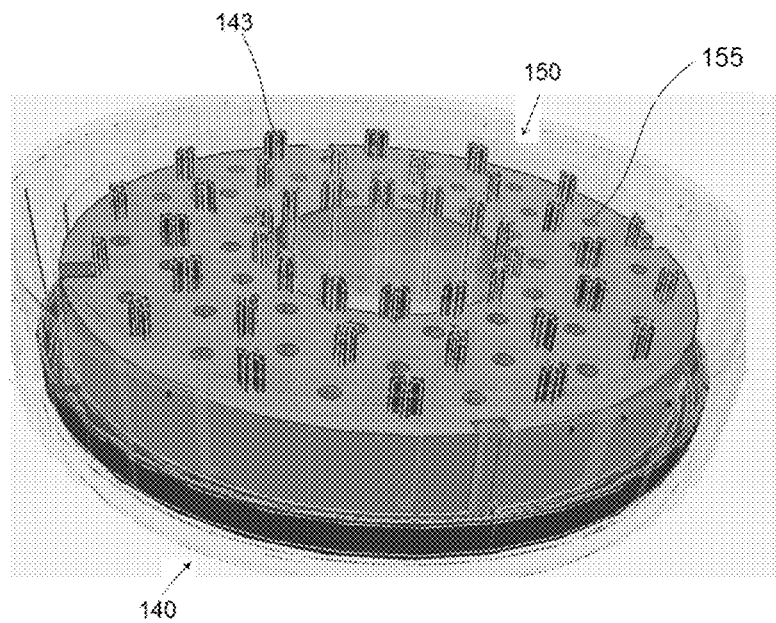
Figure 16:
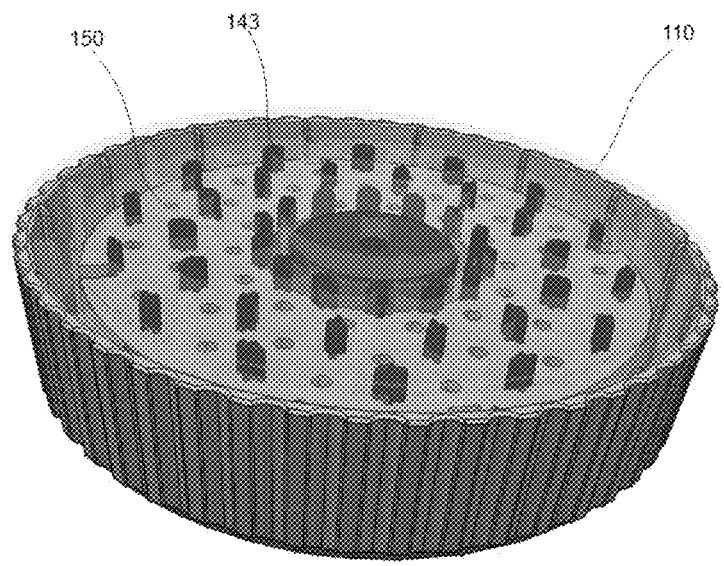

Reference is now made to FIGS. 14 to 16, presenting an assembling procedure in a step-by-step manner. Fastener support 140 is provided with a plurality of channels 145 configured for inserting fasteners to be stored (not shown) and studs 143. Retaining member 150 has bores 155 having a diameter effective for the fastener when stored and guiding the fasteners when inserted into the surface of interest. In FIG. 16, a fastener support-retaining member arrangement is placed into cap 110.

Figure 17:
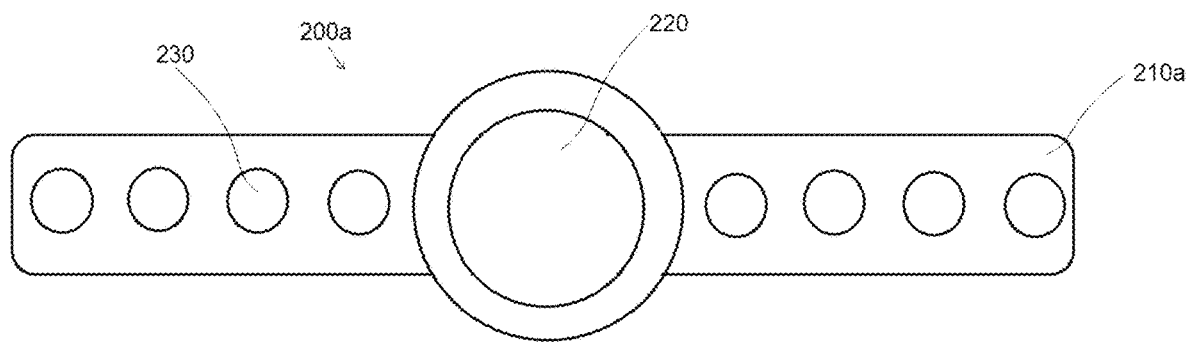
FIGS. 17 to 21 illustrate exemplary embodiments of an apparatus for storing and guiding apparatus for storing fasteners and guiding fasteners.
Figure 18:
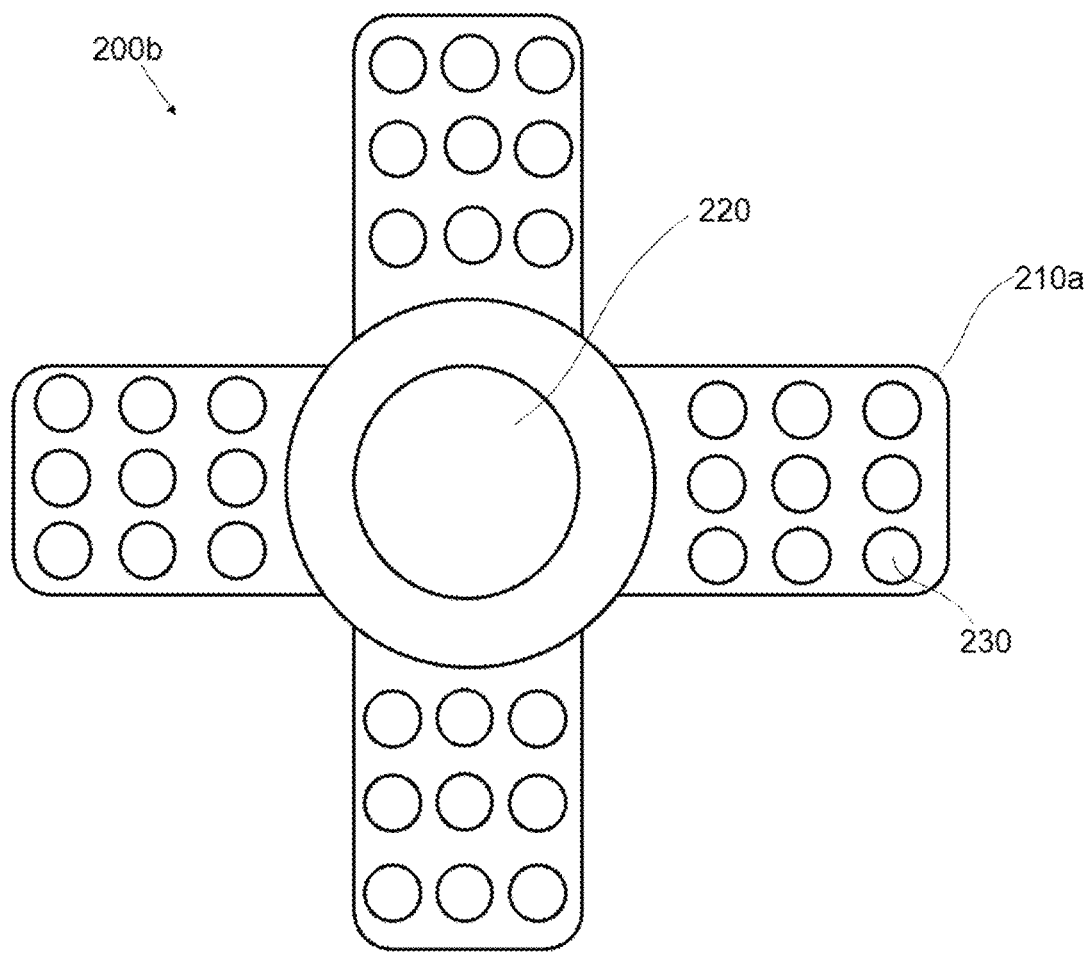
Figure 19:
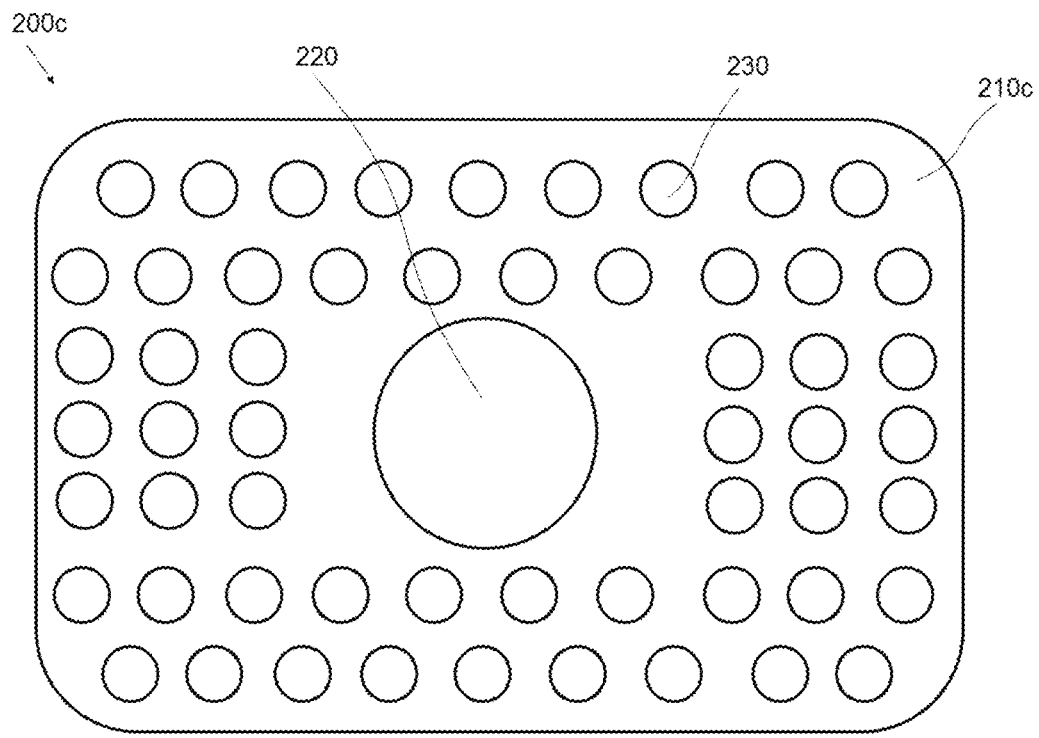
Figure 20:
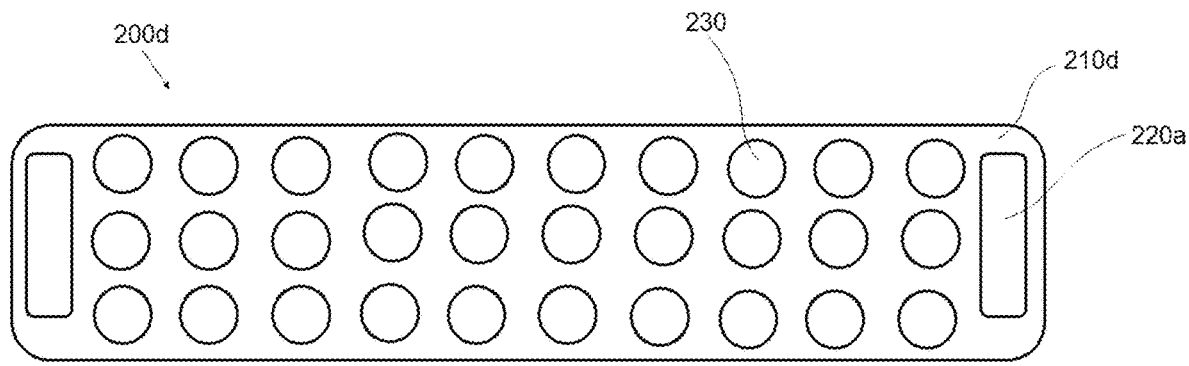
Figure 21:
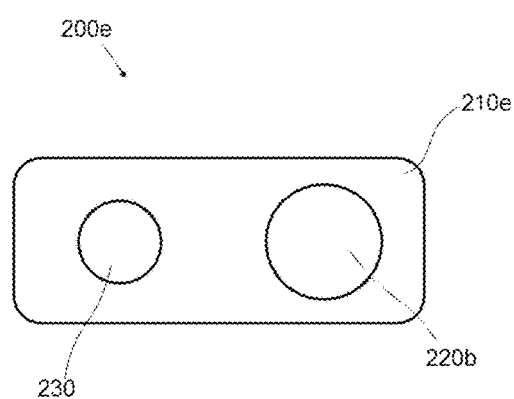

Reference is now made to FIGS. 17 to 21 presenting exemplary embodiments 200a to 200e of the apparatus for storing and guiding fasteners. FIGS. 17, 18 and 19 shows a linear (210a), crosswise (210b) and rectangular (210c) shapes, respectfully. Numeral 220 refers to a centrally disposed magnet. Fastener channels are indicated by number 230. FIG. 20 illustrates a peripheral location of magnet 220a. According to one embodiment of the present invention, only one fastener is stored and guided in device 200e.

Reference is now made to an apparatus wherein the magnet is encapsulated within a housing made of a Mu metal such that interaction between said magnet and said fasteners is minimized.

Reference is further made to the aforesaid apparatus where the tool bit is adjustable according to length of penetration required.

Reference is further made to the aforesaid apparatus wherein the tool bit is provided as a plurality of selectable bits.

Reference is further made to the aforesaid apparatus wherein the tool bit is provided to connect to an impact connection to said driver or any conventional connection to said driver.

Reference is further made to the aforesaid apparatus wherein the screw support may be configured to comprise a single screw.

Reference is further made to the aforesaid apparatus provided with or without the screws or fasteners.

Reference is further made to the aforesaid apparatus wherein said fastener support is rotatable relative to said holder by means of a clutch.

Reference is further made to the apparatus for storing fasteners and guiding the fasteners during insertion into a surface, the apparatus comprising:
  a. at least one fastener configured for inserting into said surface; each of said fastener having a head and tip interconnected by a middle elongate portion;
  b. a fastener support configured to support said at least one fastener with said central axes parallel to each other, said fastener support being further configured to render a head of at least one fastener accessible with a tool configured for inserting said at least one fastener into said surface and, when said fastener support is placed in proximity to the surface, to allow each of said fasteners to advance through said fastener support to penetrate into the surface; and a wall scanner or stud finder disposed adjacent to said tips of said at least one fastener so as to provide feedback when the fastener support is in alignment with the metal or wooden support structure. It is herein acknowledged that the scanners can be used to replace the magnet, in the sense that scanners will provide the proximity indications.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus for storing fasteners and guiding the fasteners during insertion into a surface, the apparatus comprising:
  a. at least one fastener configured for inserting into said surface; each of said fastener having a head and tip interconnected by a middle elongate portion;
  b. a fastener support configured to support said at least one fastener with said central axes parallel to each other, said fastener support being further configured to render a head of at least one fastener accessible with a tool configured for inserting said at least one fastener into said surface and, when said fastener support is placed in proximity to the surface, to allow each of said fasteners to advance through said fastener support to penetrate into the surface; and
  c. a magnet configuration comprising at least one magnet, said magnet configuration disposed adjacent to said tips of said at least one fastener so as to provide tactile feedback when the fastener support is in alignment with a soft magnetic material; said fastener support comprises a block of material in which said at least one fastener is embedded;
  wherein said block is reinforced with a frame or inner matrix formed from a second material that is relatively more rigid than said material of said block, said frame or inner matrix forming a spacer to limit an extent of penetration of a driver bit through said block.

2. The apparatus of claim 1, wherein said magnet is an effective magnet to support the apparatus in contact with the surface for hands-free use.

3. The apparatus of claim 1, wherein said fastener is selected from the group consisting of a screw, a nail, a bolt, a dowel and any combination thereof.

4. The apparatus of claim 1, wherein said material of said block is resilient polymer foam shaped conformally to said at least one fastener.

5. The apparatus of claim 1, wherein said material of said block is formed primarily from fiber pulp.

6. The apparatus of claim 1, wherein the head of said at least one fastener is positioned within the material below a level of an upper face of said block, and wherein said block of material is formed with a guide channel extending from the upper face to each fastener head to guide a tool bit to the fastener head.

7. The apparatus of claim 6 wherein said tool bit is adjustable according to length of penetration required.

8. The apparatus of claim 6 wherein said tool bit is provided as a plurality of selectable bits.

9. The apparatus of claim 6 wherein said tool bit is provided to connect to an impact connection to said driver or any conventional connection to a driver.

10. The apparatus of claim 1, further comprising at least one washer or plurality thereof, each of said washers being countersunk into a lower face of said block in concentric alignment with a corresponding one of said at least one fastener.

11. The apparatus of claim 1, wherein said plurality of fasteners is of at least two different sizes.

12. The apparatus of claim 1, further comprising a holder having a receiving portion for removably receiving said fastener support and a handle providing a handgrip.

13. The apparatus of claim 12, wherein said receiving portion comprises a base surface and a top surface, said base surface and said top surface being formed with apertures positioned so as to come into alignment with said at least one fastener when said fastener support is received in said holder.

14. The apparatus of claim 12, wherein said handle is adjustable in length and/or angular position relative to said receiving portion.

15. The apparatus of claim 12, wherein said holder further comprises a magnet deployed to facilitate tactile sensing of proximity of the holder to a soft-magnetic material.

16. The apparatus of claim 1, wherein said fastener support further comprises a recess configured for receiving a magnet to facilitate tactile sensing of proximity of a holder to a soft-magnetic material.

17. The apparatus of claim 16 wherein said fastener support is rotatable relative to said holder by means of a clutch.

18. The apparatus of claim 1, wherein a screw support bears markings to indicate the distances between fasteners.

19. The apparatus of claim 18 wherein the screw support may be configured to comprise a single screw.

20. The apparatus of claim 1 comprising an indicator configured for locating metallic objects under said surface.

21. The apparatus of claim 1, wherein at least one of the following is true:
   a. said fastener characterized by a shape is selected from the group consisting of a linear shape, a crosswise shape, a round shape, a rectangular shape and any combination thereof;
   b. said fastener support is rotatable relatively to said holder; and
   c. said fastener support is releasably lockable in said holder.

22. The apparatus of claim 1, wherein at least one magnet is disposed in a portion of said fastener support selected from the group consisting of a middle portion, a peripheral portion and a combination thereof.

23. The apparatus of claim 1 provided with or without said screws or fasteners.

24. An apparatus for storing fasteners and guiding the fasteners during insertion into a surface, the apparatus comprising:

a. at least one fastener configured for inserting into said surface; each of said fastener having a head and tip interconnected by a middle elongate portion,
   b. a fastener support configured to support said at least one fastener with said central axes parallel to each other, said fastener support being further configured to render a head of at least one fastener accessible with a tool configured for inserting said at least one fastener into said surface and, when said fastener support is placed in proximity to the surface, to allow each of said fasteners to advance through said fastener support to penetrate into the surface; and a wall scanner or stud finder disposed adjacent to said tips of said at least one fastener so as to provide feedback when the fastener support is in alignment with the metal or wooden support structure;
   said fastener support comprises a block of material in which said at least one fastener is embedded;
   wherein said block is reinforced with a frame or inner matrix formed from a second material that is relatively more rigid than said material of said block, said frame or inner matrix forming a spacer to limit an extent of penetration of a driver bit through said block.

25. An apparatus for storing fasteners and guiding the fasteners during insertion into a surface, the apparatus comprising:
   a. at least one fastener configured for inserting into said surface; each of said fastener having a head and tip interconnected by a middle elongate portion;
   b. a fastener support configured to support said at least one fastener with said central axes parallel to each other, said fastener support being further configured to render a head of at least one fastener accessible with a tool configured for inserting said at least one fastener into said surface and, when said fastener support is placed in proximity to the surface, to allow each of said fasteners to advance through said fastener support to penetrate into the surface; and
   c. a magnet configuration comprising at least one magnet, said magnet configuration disposed adjacent to said tips of said at least one fastener so as to provide tactile feedback when the fastener support is in alignment with a soft magnetic material; wherein said magnet is encapsulated within a housing made of a Mu metal such that interaction between said magnet and said fasteners is minimized.

* * * * *